United States Patent
Sasaki et al.

(10) Patent No.: US 9,402,068 B2
(45) Date of Patent: Jul. 26, 2016

(54) LENS SYSTEM FOR 3D VIDEO TAKING

(71) Applicant: FUJIFILM Corporation, Tokyo (JP)

(72) Inventors: Tadashi Sasaki, Saitama (JP); Atsushi Misawa, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 315 days.

(21) Appl. No.: 14/030,429

(22) Filed: Sep. 18, 2013

(65) Prior Publication Data

US 2014/0015938 A1 Jan. 16, 2014

Related U.S. Application Data

(63) Continuation of application No. PCT/JP2012/056710, filed on Mar. 15, 2012.

(30) Foreign Application Priority Data

Mar. 18, 2011 (JP) ................... 2011-061455

(51) Int. Cl.
| | |
|---|---|
| H04N 15/00 | (2006.01) |
| H04N 13/02 | (2006.01) |
| H04N 9/47 | (2006.01) |
| G03B 5/02 | (2006.01) |
| G03B 35/10 | (2006.01) |

(52) U.S. Cl.
CPC ............. *H04N 13/0246* (2013.01); *G03B 5/02* (2013.01); *G03B 35/10* (2013.01); *H04N 13/0239* (2013.01); *H04N 13/0296* (2013.01)

(58) Field of Classification Search
USPC ..................................................... 348/42–60
See application file for complete search history.

(56) References Cited

U.S. PATENT DOCUMENTS

| | | | |
|---|---|---|---|
| 5,699,108 A | 12/1997 | Katayama et al. | |
| 8,406,619 B2 | 3/2013 | Cameron et al. | |
| 8,666,241 B2 | 3/2014 | Cameron et al. | |
| 2006/0039529 A1* | 2/2006 | Tsubaki | A61B 6/022 378/41 |

(Continued)

FOREIGN PATENT DOCUMENTS

| | | |
|---|---|---|
| DE | 20 2007 010 389 | 9/2007 |
| JP | 07-72600 | 3/1995 |

(Continued)

OTHER PUBLICATIONS

International Search Report, PCT/JP2012/056710, Apr. 17, 2012.

(Continued)

*Primary Examiner* — Andy Rao
*Assistant Examiner* — Jared Walker
(74) *Attorney, Agent, or Firm* — Young & Thompson

(57) ABSTRACT

A system which has two lens devices 10R and 10L and in which a baseline length of the lens devices 10R and 10L can be changed is equipped with a knob 60 for commanding of the degree of three-dimensionality; and a baseline length calculation unit 52 for calculating a baseline length that is most suitable to produce 3D video data that conforms to shooting conditions, being dependent on a subject to be shot by camera devices 20R and 20L, of the camera devices 20R and 20L to which the two lens devices 10R and 10L are attached with the degree of three-dimensionality specified by the knob 60 using information indicating the degree of three-dimensionality specified by the knob 60 and the shooting conditions, and outputting information of the calculated baseline length.

18 Claims, 5 Drawing Sheets

(56) References Cited

U.S. PATENT DOCUMENTS

| | | | |
|---|---|---|---|
| 2010/0238272 A1* | 9/2010 | Cameron | H04N 13/0239 348/47 |
| 2010/0295925 A1* | 11/2010 | Maier | G03B 35/10 348/47 |
| 2013/0208095 A1 | 8/2013 | Cameron et al. | |

FOREIGN PATENT DOCUMENTS

| | | |
|---|---|---|
| JP | 2002-112288 | 4/2002 |
| JP | 2003-348621 | 12/2003 |
| JP | 2007-288229 | 11/2007 |
| JP | 2010-217410 | 9/2010 |
| WO | 2010/111040 | 9/2010 |

OTHER PUBLICATIONS

Written Opinion, PCT/ISA/237, mailed Apr. 17, 2012.
Japanese Office Action dated Feb. 17, 2015; Application No. 2013-505931.
Extented European Search Report—EP 12 76 0473—Aug. 1, 2014.
Lipton L: "Stereographics: Developers' Handbook", Stereographics Developers Handbook, XX, XX, Jan. 1, 1997 (Jan. 1, 1991), page complete, XP002239311, *p. 10, line 38*, *p. 18, line 37-p. 24, line 14*, p. 36, line 1-p. 39, line 17*.
CN Office Action, dated Aug. 24, 2015; Application No. 201280014126.3.
European Office Action dated Jan. 26, 2016; Application No. 12 760 473.4.

* cited by examiner

LENS SYSTEM FOR 3D VIDEO TAKING

CROSS REFERENCE TO RELATED APPLICATION

This is a continuation of International Application No. PCT/JP2012/056710 filed on Mar. 15, 2012, and claims priority from Japanese Patent Application No. 2011-061455 filed on Mar. 18, 2011, the entire disclosure of which is incorporated herein by reference.

TECHNICAL FIELD

The present invention relates to a lens system for 3D video taking.

BACKGROUND ART

In recent years, flat TV receivers capable of displaying 3D video to viewers (what is called 3D-compatible) have been being developed enthusiastically. Also in the TV industry, the necessity of generating 3D video data that are in such a form as to enable display of 3D video to viewers has increased. It is expected that the demand for 3D-shooting-compatible TV camera systems capable of producing 3D video data will increase.

Three-dimensional video data can be produced by simultaneously producing two video data having a parallax. In general, 3D shooting systems in which two imaging units are spaced from each other in the left-right direction are used for this purpose (refer to Patent documents 1-3).

In such 3D shooting systems, the distance between the optical axes of optical systems included in the two respective imaging units is called a baseline length and the parallax between two video data obtained by the two imaging units can be adjusted by changing the baseline length.

For example, Patent document 1 discloses a technique that in a single camera having two imaging units an optimum baseline length is calculated according to a zoom lens position and a focus lens position and the distance between the imaging units is controlled so as to become equal to this baseline length.

Patent document 2 discloses a technique that in a camera which performs 3D shooting using two optical systems and a single imaging device an optimum baseline length between the two optical systems is calculated from a focal length and a subject distance and the distance between the two optical systems is controlled so as to become equal to this baseline length.

Patent document 3 discloses the following technique in a system having two cameras. When a user sets a desired subject distance, a vergence angle and a baseline length between the two cameras are calculated on the basis of the subject distance and displayed on a display unit and the vergence angle and the baseline length between the two cameras are changed.

PRIOR ART DOCUMENTS

Patent Documents

Patent document 1: JP-A-2010-217410
Patent document 2: JP-A-2002-112288
Patent document 3: JP-A-2007-288229

SUMMARY OF THE INVENTION

Problems to Be Solved by the Invention

The systems disclosed in Patent documents 1-3 can produce 3D video data having three-dimensionality that is suitable for a subject to be shot because the baseline length can be changed according to subject-dependent camera shooting conditions such as a zoom lens position, a focus lens position, a focal length, a subject distance, etc. However, each videographer has his or her own tastes for video. Therefore, systems in which three-dimensionality is determined automatically according to camera shooting conditions that are determined depending on a subject are not necessarily high in usability to videographers.

Patent documents 1 and 2 disclose configurations in which the baseline length can be changed manually. However, great skill is necessary to produce good 3D video data by changing the baseline length manually irrespective of camera shooting conditions that are determined depending on a subject. It is desired that good 3D video data be produced by a simple manipulation.

The present invention has been made in the above circumstances, and an object of the invention is therefore to provide a lens system for 3D video taking which makes it possible to produce good 3D video data having desired three-dimensionality with a simple manipulation.

Means for Solving the Problems

A lens system for 3D video taking according to the invention is a lens system for 3D video taking which has two lens devices and in which a baseline length of the two lens devices can be changed, comprising a three-dimensionality manipulation unit for commanding of a degree of three-dimensionality of 3D video; and a baseline length calculation unit for calculating a baseline length that is most suitable to produce 3D video data that conforms to shooting conditions of camera devices to which the two lens devices are attached with the degree of three-dimensionality specified through the three-dimensionality manipulation unit using information indicating the degree of three-dimensionality specified through the three-dimensionality manipulation unit and the shooting conditions, and outputting information of the calculated baseline length.

Advantages of the Invention

The present invention can provide a lens system for 3D video taking which makes it possible to produce good 3D video data having desired three-dimensionality with a simple manipulation.

MODES FOR CARRYING OUT THE INVENTION

An embodiment of the present invention will be hereinafter described with reference to the drawings.

Figure 1:
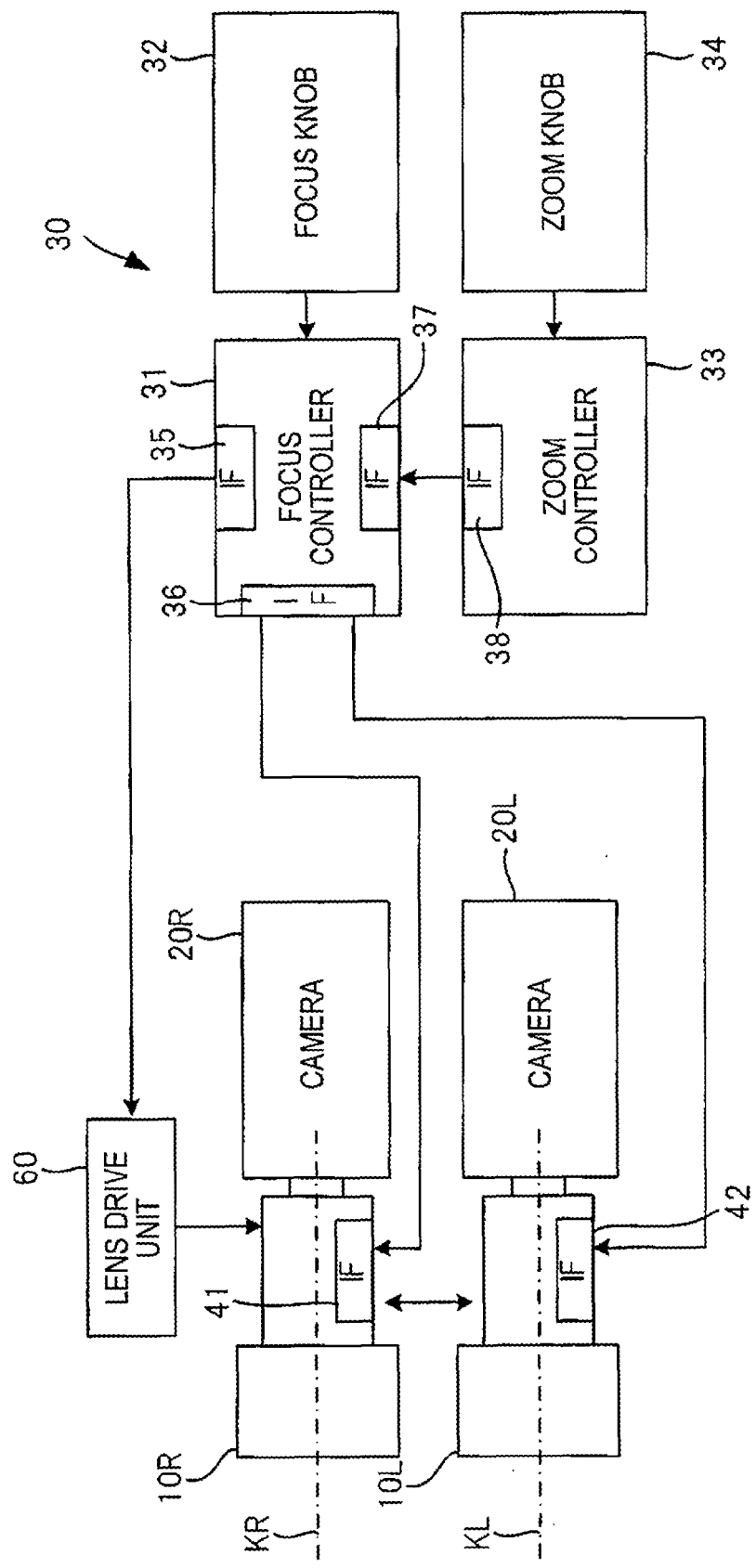
FIG. 1 is a drawing for description of the embodiment of the invention which shows a general configuration of a 3D video taking system.

FIG. 1 is a drawing for description of the embodiment of the invention which shows a general configuration of a 3D video taking system.

The 3D video taking system is equipped with two camera devices 20R and 20L which are arranged in the horizontal direction on an electromotive rig and a lens system for 3D video taking. At least one of the camera devices 20R and 20L is disposed movably, whereby the horizontal interval between the camera devices 20R and 20L can be varied.

The lens system for 3D video taking is equipped with lens devices 10R and 10L which are arranged side by side in the horizontal direction on the electromotive rig, a lens drive unit 60 for varying the baseline length of the lens devices 10R and 10L (i.e., the distance between the optical axis KR of the lens device 10R and the optical axis KL of the lens device 10L) by controlling the position of at least one of the lens devices 10R and 10L, and a lens operating unit 30 for operating the lens devices 10R and 10L. The lens operating unit 30 incorporates a controller for controlling the lens devices 10R and 10L and the lens drive unit 60.

The lens devices 10R and 10L are attached to the respective camera devices 20R and 20L. The system is configured so that when the position of at least one of the lens devices 10R and 10L is changed by the lens drive unit 60, the positions of the camera devices 20R and 20L are also changed in link with it.

A parallax occurs between an image taken by the lens device 10R and the camera device 20R and an image taken by the lens device 10L and the camera device 20L according to the baseline length of the lens devices 10R and 10L. Therefore, 3D video data which enables 3D vision can be obtained by recording these two image in a correlated manner.

The lens devices 10R and 10L are equipped with respective interfaces (IFs) 41 and 42 for performing a serial communication with the lens operating unit 30.

The lens operating unit 30 is equipped with a focus controller 31 for controlling focus lens groups included in the respective lens devices 10R and 10L, a focus knob 32 for commanding a focus position, a zoom controller 33 for controlling zoom lens groups included in the respective lens devices 10R and 10L, and a zoom knob 34 for commanding a zoom position.

The focus controller 31 is equipped with an IF 35 which is connected to the lens drive unit 60, an IF 36 which is connected to an IF 41 of the lens device 10R and an IF 42 of the lens device 10L, and an IF 37 which is connected to an IF 38 of the zoom controller 33. The focus controller 31 communicates with the lens devices 10R and 10L through the IF 36, communicates with the lens drive unit 60 through the IF 35, and communicates with the zoom controller 33 through the IF 37.

Figure 2:
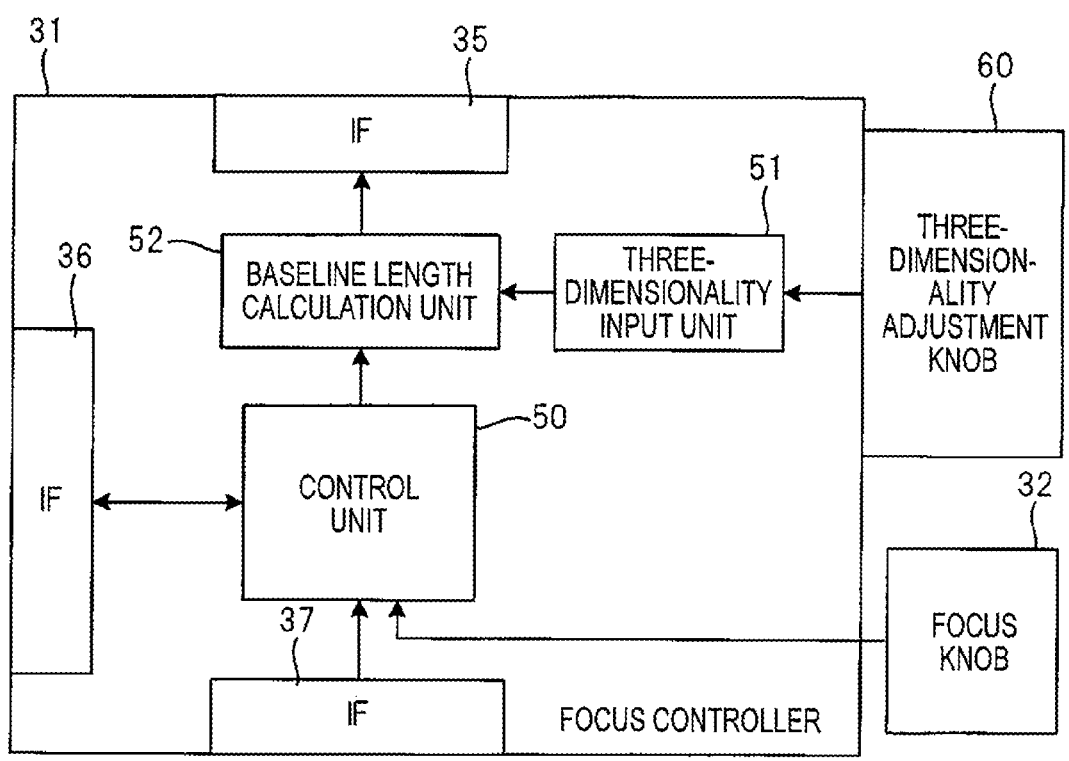
FIG. 2 is a drawing showing, in detail, the internal configuration of a focus controller 31 of the 3D video taking system shown in FIG. 1.
Figure 3:
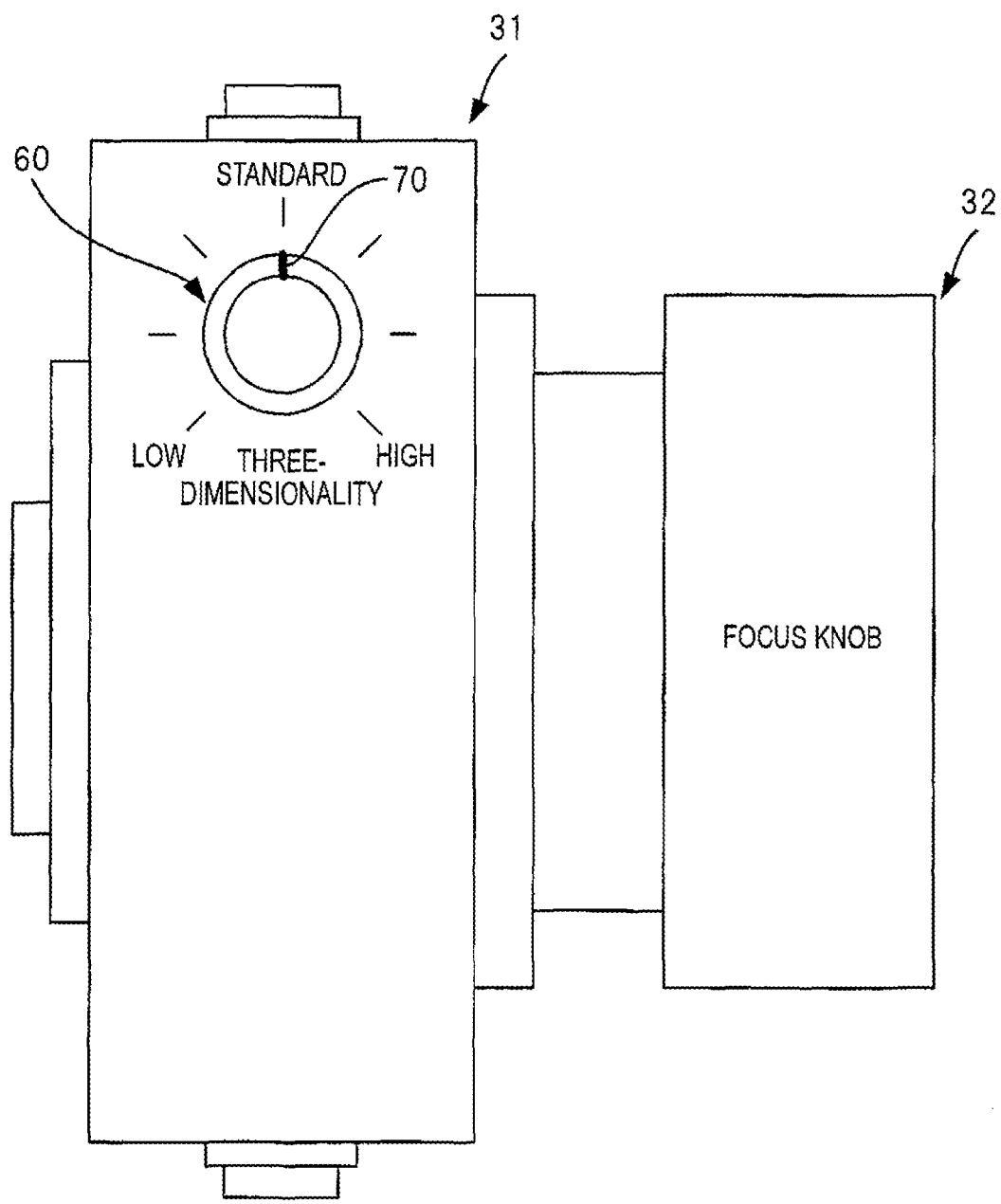
FIG. 3 is a drawing showing appearances of the focus controller 31 and a focus knob 32 of the 3D video taking system shown in FIG. 1.

FIG. 2 is a drawing showing, in detail, the internal configuration of the focus controller 31 of the 3D video taking system shown in FIG. 1. FIG. 3 is a drawing showing appearances of the focus controller 31 and the focus knob 32 of the 3D video taking system shown in FIG. 1.

As shown in FIG. 2, the focus controller 31 is equipped with a control unit 50, a baseline length calculation unit 52, a three-dimensionality input unit 51, and a three-dimensionality adjustment knob 60 in addition to the IFs 35-37.

The three-dimensionality adjustment knob 60 is a manipulation unit for commanding the degree of three-dimensionality. As shown in FIG. 3, the three-dimensionality adjustment knob 60 is a dial-shaped knob provided on the outer circumferential surface of the body of the focus controller 31.

A user can make an instruction to increase the three-dimensionality of 3D video data taken by the 3D video taking system by turning the three-dimensionality adjustment knob 60 clockwise on a scale 70 from a "standard" state. And the user can make an instruction to decrease the three-dimensionality of 3D video data taken by the 3D video taking system by turning the three-dimensionality adjustment knob 60 counterclockwise on the scale from the "standard" state. A state for commanding highest three-dimensionality is established by turning the knob 60 to "high" on the scale 70, and a state for commanding lowest three-dimensionality is established by turning the knob 60 to "low" on the scale 70.

The three-dimensionality adjustment knob 60 is not limited to a dial-type knob and may be, for example, such that the degree of three-dimensionality can be varied using a slide bar or plus and minus buttons.

The three-dimensionality input unit 51 reads a position of the three-dimensionality adjustment knob 60 on the scale 70 and inputs, to the baseline length calculation unit 52, information indicating the degree of three-dimensionality commanded by a user.

The control unit 50 converts a focus knob 32 manipulation signal into a focus position instruction signal and sends the latter to the camera devices 10R and 10L through the IF 36. The control unit 50 also calculates information of a distance to a subject using the focus position instruction signal.

Furthermore, the control unit 50 also receives a zoom knob 34 manipulation signal from the zoom controller 33, converts it into a zoom position instruction signal, and sends the latter to the camera devices 10R and 10L through the IF 36. The control unit 50 also calculates a focal length using the zoom position instruction signal.

The control unit 50 incorporates a memory such as an EEPROM, which is stored with information relating to the camera devices 20R and 20L (sizes of imaging devices mounted therein, an assumed display size of 3D video data, etc.) in advance.

Using the information indicating the degree of three-dimensionality that is input from the three-dimensionality input unit 51, the information relating to the camera devices 20R and 20L stored in the memory that is incorporated in the control unit 50, and the information of the distance to the subject and the focal length information calculated by the control unit (subject-dependent shooting conditions of the camera devices 20R and 20L), the baseline length calculation unit 52 calculates a baseline length value of the lens devices 10R and 10L that is most suitable for producing 3D video data that conforms to the shooting conditions of the camera devices 20R and 20L with three-dimensionality specified by the three-dimensionality adjustment knob 60.

The baseline length calculation unit 52 calculates a baseline length X for obtaining 3D video data having three-dimensionality desired by the user through a calculation according to the following Equation (1), for example:

$$X = (k \times L)/f \qquad (1)$$

where $$k = \{(P_{max} \times W_f)/W_s\} \times D;$$

L: distance to the subject;
f: focal length of the lens devices 10R and 10L

Pmax: maximum parallax with the assumed display size (about 65 mm (interval between the human eyes));

Wf: horizontal width of the imaging devices incorporated in the camera devices 20R and 20L (9.58 mm in the case of ⅔-inch imaging devices);

Ws: horizontal width of the assumed display size (about 2,000 mm in the case a use with business 3D TV receivers); and D: coefficient determined according to the degree of three-dimensionality (for example, where D is equal to 1 when the three-dimensionality adjustment knob 60 is set at "standard" on the scale 70, the D value increases as the three-dimensionality adjustment knob 60 is turned toward "high" on the scale 70 and decreases as the three-dimensionality adjustment knob 60 is turned toward "low" on the scale 70.

Pmax, Wf, and Ws are data that are stored in the internal memory of the control unit 50.

Equation (1) assumes a situation of shooting persons against the background of a landscape. Where a scene including distant persons and nearby persons is assumed, a baseline length may be calculated according to the following Equation (2):

$$X = [\{k \times (L\max \times L\min)\}/(L\max - L\min)]/f \quad (2)$$

where

Lmax: distance to the most distant subject; and

Lmin: distance to the nearest subject.

Where Equation (2) is employed, when a mode in which the focus controller 31 is to calculate a baseline length, first a user manipulates the focus knob 32 so that focusing is made on the most distant subject and pushes an enter button (not shown). Then, the user manipulates the focus knob 32 so that focusing is made on the nearest subject and pushes an enter button (not shown). The control unit 50 of the focus controller 31 may calculate Lmax and Lmin on the basis of positions of the focus knob 32 at the time points when the enter button was pushed.

In Equation (1), L may be changed to L×D or f may be changed to f/D instead of deleting D from the equation of k.

Figure 4:
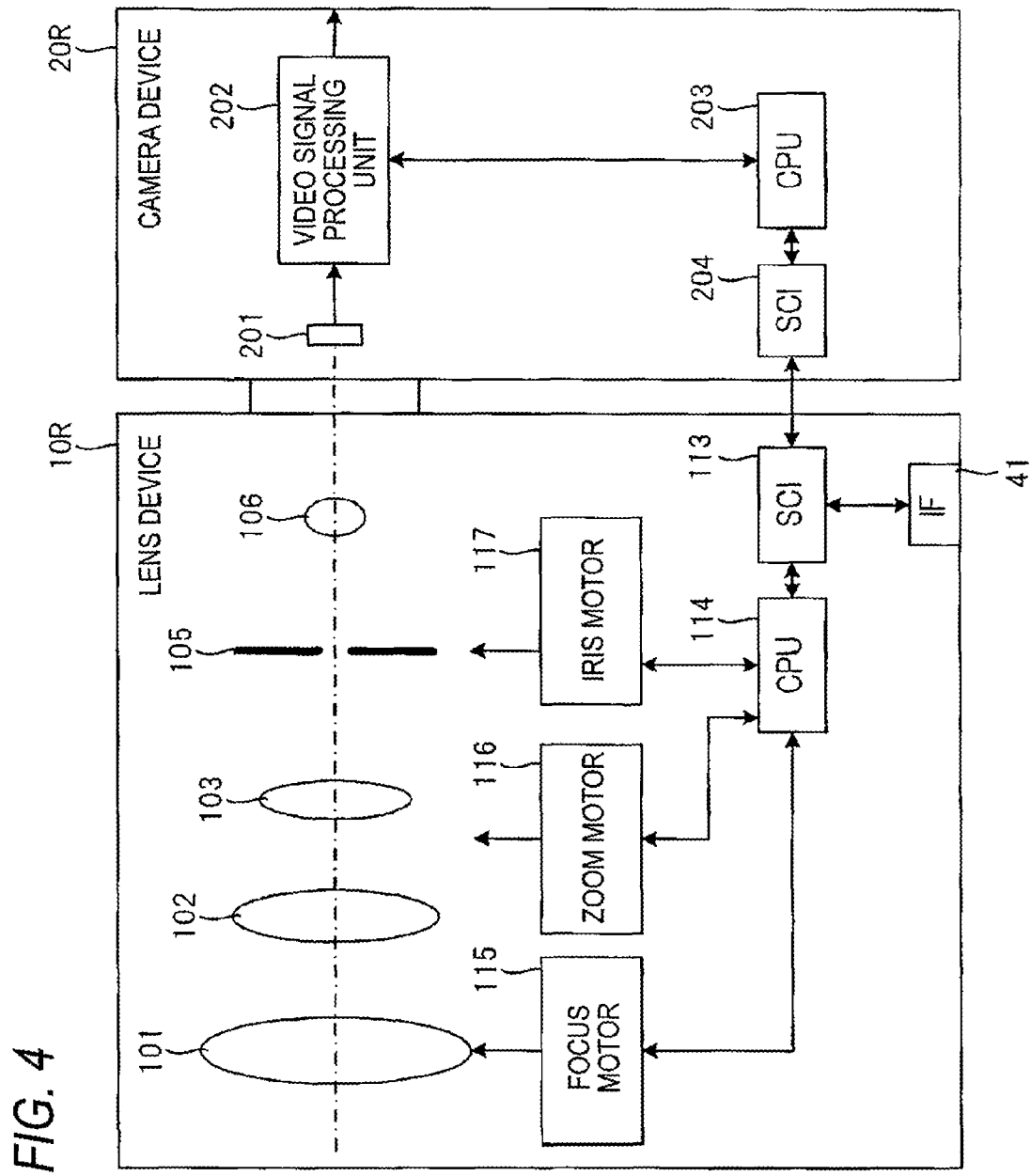
FIG. 4 is a drawing showing the internal configurations of a lens device 10R and a camera device 20R of the 3D video taking system shown in FIG. 1.

FIG. 4 is a drawing showing the internal configurations of the lens device 10R and the camera device 20R of the 3D video taking system shown in FIG. 1.

The camera device 20R is equipped with an imaging unit 201 which includes an imaging device disposed on the optical axis KR of the lens device 10R, a video signal processing unit 202 for generating image data by processing an imaging signal obtained through imaging by the imaging unit 201, a CPU 203 for controlling the entire camera device 20R in a unified manner, and an SCI (serial communication interface) 204 for communicating with the lens device 10R.

The shooting optical system of the lens device 10R is equipped with a focus lens group 101, zoom lens groups 102 and 103, an iris 105, and a master lens group 106 which are arranged in this order from the subject side.

The lens device 10R is also equipped with a focus motor 115 for controlling the position of the focus lens group 101, a zoom motor 116 for controlling the positions of the zoom lens groups 102 and 103, an iris motor 117 for open/close-controlling the iris 105, a CPU 114 for driving the focus motor 115, the zoom motor 116, and the iris motor 117, an SCI 113 for communicating with the camera device 20R, and the IF 41.

The internal configurations of the lens device 10L and the camera device 20L are the same as the internal configurations shown in FIG. 4 except that the IF 42 replaces the IF 41, and hence will not be described in detail.

The CPU 114 which is included in each of the lens devices 10R and 10L performs a focus position control and a zoom position control by driving the focus motor 115 and the zoom motor 116 according to a focus position instruction signal and a zoom position instruction signal received from the focus controller 31, respectively.

Next, a description will be made of how the above-configured 3D video taking system operates.

Figure 5:
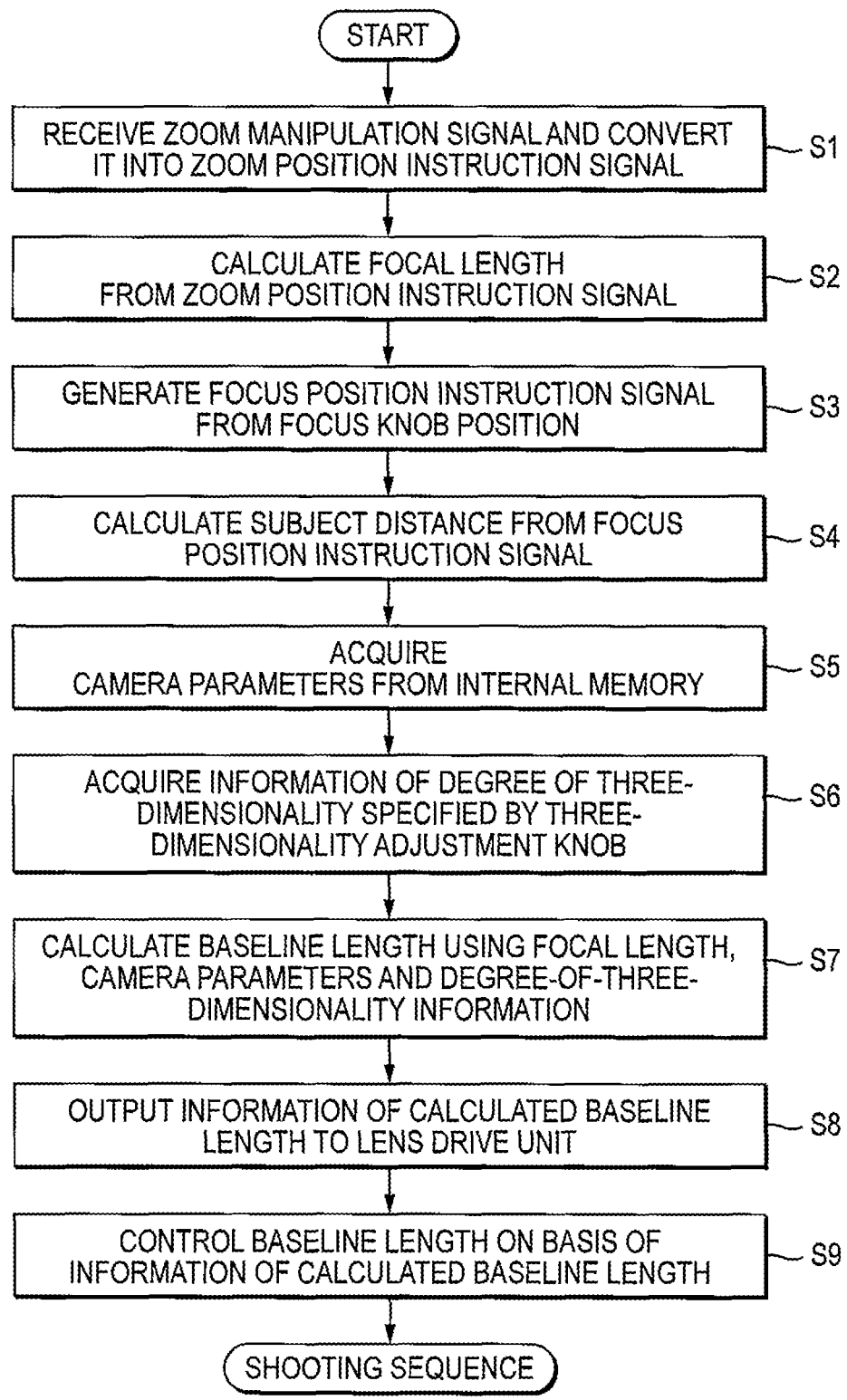
FIG. 5 is a flowchart showing how the 3D video taking system shown in FIG. 1 operates.

FIG. 5 is a flowchart showing how the 3D video taking system shown in FIG. 1 operates.

First, at a preparatory stage, a user who is going to use this system connects a computer to a communication terminal (not shown) of the focus controller 31 and inputs pieces of information relating to the camera devices 20R and 20L (camera parameters) using the computer. The pieces of information relating to the camera devices 20R and 20L that have been input to the computer are received by the control unit 50 of the focus controller 31 and stored in the memory of the control unit 50. The camera parameters include such pieces of information as sizes of the imaging devices mounted in the camera devices 20R and 20L, an assumed display size of 3D video data, and a maximum parallax with this display size.

Then, the user powers on the lens devices 10R and 10L, specifies a zoom position by manipulating the zoom knob 34, and specifies a focus position by manipulating the focus knob 32. Furthermore, the user specifies desired three-dimensionality by manipulating the three-dimensionality adjustment knob 60.

When the zoom position has been specified, the control unit 50 of the focus controller 31 receives a manipulation signal of the zoom knob 34 from the zoom controller 33, converts the received manipulation signal into a zoom position instruction signal (step S1), and sends the latter to the lens devices 10R and 10L. In each of the lens devices 10R and 10L, the zoom lens groups 102 and 103 are moved according to the zoom position instruction signal.

Then, the control unit 50 calculates a focal length of the lens devices 10R and 10L using the zoom position instruction signal obtained at step S1 (step S2), and inputs information of the calculated focal length to the baseline length calculation unit 52. A focal length can be calculated from a zoom position instruction signal because there is correspondence between focal lengths of the lens devices 10R and 10L and positions of the zoom lens groups 102 and 103 and a table of this correspondence is stored in the memory of the control unit 50 in advance.

A table of correspondence between focal lengths of the lens devices 10R and 10L and positions of the zoom lens groups 102 and 103 is determined by an actual measurement and stored in the internal memory of the control unit 50 in advance before shipment of the lens system 10 for 3D video taking by its manufacturer.

When the focal length has been specified, the control unit 50 receives a manipulation signal of the focus knob 32, the control unit 50 receives a manipulation signal of the focus knob 32, converts the received manipulation signal into a focus position instruction signal (step S3), and sends the latter to the lens devices 10R and 10L. In each of the lens devices 10R and 10L, the focus lens group 101 is moved according to the focus position instruction signal.

Then, the control unit 50 calculates a subject distance using the focus position instruction signal obtained at step S3 (step S4), and inputs information of the calculated focal length to the baseline length calculation unit 52. A subject distance can be calculated from a zoom position instruction signal because there is correspondence between subject distances and positions of the focus lens group 101 and a table of this correspondence is stored in the memory of the control unit 50 in advance.

A table of correspondence between subject distances and positions of the focus lens group 101 is determined by an actual measurement and stored in the internal memory of the control unit 50 in advance before shipment of the lens system for 3D video taking by its manufacturer.

Then, the baseline length calculation unit 52 acquires information relating to the camera devices 20R and 20L (camera parameters) from the internal memory of the control unit 50 (step S5), and acquires information of the degree of three-dimensionality specified by the three-dimensionality adjustment knob 60 from the three-dimensionality input unit 51 (step S6).

Then, the baseline length calculation unit 52 calculates a baseline length through a calculation according to, for example, the above-mentioned Equation (1) using the focal length information and the subject distance information that have been input from the control unit 50, the pieces of information relating to the camera devices 20R and 20L that have been acquired from the internal memory of the control unit 50, and the degree-of-three-dimensionality information that has been input from the three-dimensionality input unit 51 (step S7), and outputs information indicating the calculated baseline length to the lens drive unit 60 (step S8).

The lens drive unit 60 receives this information, and moves at least one of the lens devices 10R and 10L in the horizontal direction on the electromotive rig so that the baseline length of the lens devices 10R and 10L becomes equal to the baseline length indicated by the received information (step S9).

After the execution of step S9, a transition is made to a shooting sequence. If one of the focus knob 32, the zoom knob 34, and the three-dimensionality adjustment knob 60 is manipulated in the shooting sequence, steps S1-S9 are executed again and the baseline length is thereby readjusted.

As described above, in the 3D video taking system shown in FIG. 1, a baseline length is calculated not only based on subject-dependent shooting conditions of the camera devices 20R and 20L such as a focal length and a subject distance but also taking into consideration the degree of three-dimensionality specified by the three-dimensionality adjustment knob 60. Therefore, 3D video data that conforms to the shooting conditions can be obtained as having three-dimensionality desired by a user.

For example, in camera systems in which the baseline length can be changed manually, to determine a baseline length that is suitable for shooting conditions, it is necessary to learn a relationship between the baseline length and 3D video data empirically by changing the baseline length many times, which requires great skill.

In contrast, in the 3D video taking system shown in FIG. 1, a baseline length calculated by the baseline length calculation unit 52 has a value that is obtained by correcting a baseline length that is most suitable for shooting conditions (reference baseline length) according to the degree of three-dimensionality specified by the three-dimensionality adjustment knob 60 (when D is set equal to 1 in Equation (1), the baseline length X becomes equal to the one most suitable for the shooting conditions). As a result, 3D video data that is suitable for stereoscopic viewing of a subject to be shot can be obtained with three-dimensionality desired by a user. In addition, this advantage can be obtained by a simple manipulation without requiring any skill.

Furthermore, in the 3D video taking system shown in FIG. 1, even when the shooting conditions of the camera devices 20R and 20L have been changed, a baseline length is recalculated according to new shooting conditions and the degree of three-dimensionality specified by the three-dimensionality adjustment knob 60. That is, if a user specifies desired three-dimensionality by manipulating the three-dimensionality adjustment knob 60 once, 3D video data having the specified three-dimensionality can continue to be obtained automatically even if the shooting conditions are changed thereafter. Thus, the 3D video taking system can be increased in usability.

While images taken by the camera devices 20R and 20L are being recorded, it is preferable that the baseline length calculation unit 52 calculate a baseline length using information indicating the degree of three-dimensionality that was specified by the three-dimensionality adjustment knob 60 immediately before the start of recording of the images taken and shooting conditions of the camera devices 20R and 20L.

If a change of the degree of three-dimensionality specified by manipulating the three-dimensionality adjustment knob 60 is accepted during recording of images taken by the camera devices 20R and 20L, the baseline length may be changed to a large extent during the shooting to produce poor 3D video data. In view of the above, during recording of images taken by the camera devices 20R and 20L, a large change of the baseline length can be prevented by calculating a baseline length using a value that was specified by the three-dimensionality adjustment knob 60 immediately before the start of recording of the images taken and shooting conditions of the camera devices 20R and 20L.

Although in the above description the baseline length of the lens devices 10R and 10L is changed automatically according to a baseline length calculated by the baseline length calculation unit 52, the invention is not limited to such a case. For example, the system may be configured so that information of a baseline length calculated by the baseline length calculation unit 52 is displayed on a display device connected to the IF 35 and a user who is viewing the display device moves the positions of the lens devices 10R and 10L manually so as to attain the displayed baseline length.

Even in the configuration in which the baseline length of the lens devices 10R and 10L is changed automatically according to a baseline length calculated by the baseline length calculation unit 52, information of a baseline length calculated by the baseline length calculation unit 52 may be conveyed to a user by displaying it on a display device connected to the IF 35. This makes it possible to move the lens devices 10R and 10L manually according to the baseline length displayed on the display device and to thereby continue the shooting even in a situation that the lens devices 10R and 10L cannot be position-controlled because of a failure of the lens drive unit 60

The baseline length calculation unit 52 may be provided in the lens device 10R or 10L. In this case, the baseline length calculation unit 52 provided in the lens device 10R or 10L may acquire a focal length, a subject distance, camera parameters, and information indicating the degree of three-dimensionality, calculate a baseline length using these pieces of information, and output the calculated baseline length to the lens drive unit 60 or the display device via the focus controller 31.

Since the focus controller 31 has a relatively large body, providing it with the baseline length calculation unit 52 and the three-dimensionality adjustment knob 60 enables efficient use of the space occupied by the entire system.

As described above, this specification discloses the following items:

The disclosed lens system for 3D video taking is a lens system for 3D video taking which has two lens devices and in which a baseline length of the two lens devices can be changed, comprising a three-dimensionality manipulation unit for commanding of a degree of three-dimensionality of 3D video; and a baseline length calculation unit for calculating a baseline length that is most suitable to produce 3D video data that conforms to shooting conditions of camera devices to which the two lens devices are attached with the degree of three-dimensionality specified through the three-dimensionality manipulation unit using information indicating the degree of three-dimensionality specified through the three-dimensionality manipulation unit and the shooting conditions, and outputting information of the calculated baseline length.

The disclosed lens system for 3D video taking comprises a lens position control unit for controlling the position of at least one of the two lens devices on the basis of the information of the baseline length that is output from the baseline length calculation unit so as to attain the baseline length.

The disclosed lens system for 3D video taking is such that while images taken by the camera devices to which the two lens devices are attached are being recorded, the baseline length calculation unit calculates a most suitable baseline length using information indicating a degree of three-dimensionality specified immediately before a start of the recording of the images taken and the shooting conditions irrespective of whether the three-dimensionality manipulation unit is manipulated or not.

The disclosed lens system for 3D video taking is such that the baseline length calculation unit is provided in a lens operating unit for operating the two lens devices.

The disclosed lens system for 3D video taking is such that the three-dimensionality manipulation unit is provided in the lens operating unit.

The disclosed lens system for 3D video taking comprises a display device for displaying the information of the baseline length that is output from the baseline length calculation unit.

INDUSTRIAL APPLICABILITY

The invention makes it possible to provide a lens system for 3D video taking which makes it possible to produce good 3D video data having desired three-dimensionality with a simple manipulation.

Although the invention has been described in detail by referring to the particular embodiment, it is apparent to those skilled in the art that various changes and modifications are possible without departing from the spirit and scope of the invention. The present application is based on Japanese Patent Application No. 2011-061455 filed on Mar. 18, 2011, the disclosure of which is incorporated herein by reference.

Description of Symbols
10R, 10L: Lens device
20R, 20L: Camera device
52: Baseline length calculation unit
60: Three-dimensionality adjustment knob

The invention claimed is:

1. A lens system for 3D video taking which has two lens devices and in which a baseline length of the two lens devices is changeable, comprising:
   a central processing unit (CPU) in communication with a memory having recorded therein programming code that, upon execution by the CPU, causes the CPU to operate as:
      a three-dimensionality manipulation unit that receives an input from the user as a degree of three-dimensionality for 3D video to be recorded via the lens system; and
      a baseline length calculation unit that calculates a baseline length for 3D video data based on i) the input degree of three-dimensionality input by the user via the three-dimensionality manipulation unit and ii) shooting conditions of camera devices to which the two lens devices are attached, said shooting conditions including any of lens zoom position, lens focus position, focal length, and subject distance, and generates information of the calculated baseline length as output for adjusting the baseline length of the two lenses in accordance with the calculated baseline length,
   wherein, while images taken by the camera devices to which the two lens devices are attached are being recorded during a recording operation of the lens system, the baseline length calculation unit re-calculates the baseline length using both the degree of three-dimensionality input by the user just before a start of the recording operation and the shooting conditions as the shooting conditions change during the recording of the images during the recording operation, where the degree of three-dimensionality input by the user just before the start of the recording operation is used by the baseline length calculation unit irrespective of whether a new degree of three-dimensionality is input by the user via the three-dimensionality manipulation unit during the recording operation.

2. The lens system for 3D video taking according to claim 1, further comprising:
   a lens position control unit that controls a position of at least one of the two lens devices on the basis of the calculated baseline length output from the baseline length calculation unit so as to attain the baseline length between the two lens devices.

3. The lens system for 3D video taking according to claim 1, wherein the baseline length calculation unit is provided in a lens operating unit for operating the two lens devices.

4. The lens system for 3D video taking according to claim 2, wherein the baseline length calculation unit is provided in a lens operating unit for operating the two lens devices.

5. The lens system for 3D video taking according to claim 3, wherein the three-dimensionality manipulation unit is provided in the lens operating unit.

6. The lens system for 3D video taking according to claim 4, wherein the three-dimensionality manipulation unit is provided in the lens operating unit.

7. The lens system for 3D video taking according to claim 1, further comprising:
   a display device that displays the calculated baseline length output from the baseline length calculation unit.

8. The lens system for 3D video taking according to claim 2, further comprising:
   a display device that displays the calculated baseline length that is output from the baseline length calculation unit.

9. The lens system for 3D video taking according to claim 3, further comprising:
   a display device that displays the calculated baseline length that is output from the baseline length calculation unit.

10. The lens system for 3D video taking according to claim 4, further comprising:
    a display device that displays the calculated baseline length that is output from the baseline length calculation unit.

11. The lens system for 3D video taking according to claim 5, further comprising:
    a display device that displays the calculated baseline length that is output from the baseline length calculation unit.

12. The lens system for 3D video taking according to claim 6, further comprising:
   a display device that displays the calculated baseline length that is output from the baseline length calculation unit.

13. The lens system for 3D video taking according to claim 1, further comprising:
   a hand-operated control that, when actuated by the user, provides the input to the three-dimensionality manipulation unit.

14. The lens system for 3D video taking according to claim 13, wherein the hand-operated control is a dial-type knob.

15. The lens system for 3D video taking according to claim 13, wherein the hand-operated control is a slide bar.

16. The lens system for 3D video taking according to claim 13, wherein the hand-operated control is a set of plus and minus buttons.

17. The lens system for 3D video taking according to claim 1, wherein the baseline length calculation unit calculates the baseline length as follows:

$$X = (k \times L)/f$$

where $$k = \{(P_{max} \times W_f)/W_s\} \times D,$$

L: distance to the subject,
f: focal length of the two lens devices,
$P_{max}$: maximum parallax with a predetermined display size,
$W_f$: horizontal width of the imaging devices,
$W_s$: horizontal width of a predetermined display size, and
D: coefficient determined according to the user-input degree of three-dimensionality, and where $P_{Max}$, $W_f$, and $W_s$ are data that are stored in the memory.

18. The lens system for 3D video taking according to claim 1, wherein the baseline length calculation unit calculates the baseline length as follows:

$$X = [\{k \times (L_{max} \times L_{min})\}/(L_{max} - L_{min})]/f$$

where $$k = \{(P_{max} \times W_f)/W_s\} \times D,$$

$L_{max}$: distance to a most distant subject,
$L_{min}$: distance to a nearest subject,
f: focal length of the two lens devices,
$P_{max}$: maximum parallax with a predetermined display size,
$W_f$: horizontal width of the imaging devices,
$W_s$: horizontal width of a predetermined display size, and
D: coefficient determined according to the user-input degree of three-dimensionality, and where $P_{max}$, $W_f$, and $W_s$ are data that are stored in the memory.

* * * * *